(12) United States Patent
Hansort

(10) Patent No.: US 6,854,222 B2
(45) Date of Patent: Feb. 15, 2005

(54) ADJUSTABLE SUPPORT BRACE AND MOUNTING SHOE

(75) Inventor: Rens Hansort, 728 Sigmund Rd., Naperville, IL (US) 60563

(73) Assignees: Rens Hansort; Universal Form Clamp Co., Inc., Bellwood, IL (US)

(*) Notice: Subject to any disclaimer, the term of this patent is extended or adjusted under 35 U.S.C. 154(b) by 9 days.

(21) Appl. No.: 10/336,449

(22) Filed: Jan. 3, 2003

(65) Prior Publication Data

US 2003/0131543 A1 Jul. 17, 2003

Related U.S. Application Data

(60) Provisional application No. 60/345,254, filed on Jan. 3, 2002.

(51) Int. Cl.[7] .................................. E04G 21/26
(52) U.S. Cl. ................... 52/127.2; 248/357; 248/354.3; 403/258
(58) Field of Search .............................. 52/127.2, 116, 52/149, 127.5, 749.1, 745.11; 248/357, 354.3, 354.1, 351, 300, 200, 500; 403/258, 230, 256, 259, 260; 182/111; 16/382, 271

(56) References Cited

U.S. PATENT DOCUMENTS

| | | | | |
|---|---|---|---|---|
| 3,204,910 A | * | 9/1965 | Gacher | 269/74 |
| 4,068,427 A | * | 1/1978 | Camardo | 52/127.2 |
| 4,083,156 A | * | 4/1978 | Tye | 248/354.5 |
| 4,872,634 A | | 10/1989 | Gillaspy et al. | |
| 5,758,854 A | * | 6/1998 | Shih | 248/354.3 |
| 6,065,254 A | | 5/2000 | Lanka | |

FOREIGN PATENT DOCUMENTS

DE      1 800 807      10/1968

* cited by examiner

*Primary Examiner*—Naoko Slack
(74) *Attorney, Agent, or Firm*—Michael Best & Friedrich LLP; Jeffrey D. Peterson

(57) ABSTRACT

The present invention is directed towards an adjustable support brace for a pre-cast or tilt-up wall. The adjustable support brace comprises a wall mounting shoe, a floor mounting shoe, a leg member having an upper and a lower end, and a threaded support screw. The wall mounting shoe is pivotally connected to a mounting cap which is connected to the upper end of the leg member. The lower end of the leg member has an internally threaded receiving aperture which extends at least partially through the length of the leg member. The internally threaded receiving aperture receives the threaded support screw. The support screw is pivotally connected to the floor mounting shoe.

20 Claims, 5 Drawing Sheets

ADJUSTABLE SUPPORT BRACE AND MOUNTING SHOE

CROSS REFERENCE TO RELATED APPLICATIONS

This application claims the benefit of the filing date of U.S. Provisional Application No. 60/345,254 filed on Jan. 3, 2002, which is incorporated herein by reference.

BACKGROUND OF INVENTION

The present invention is directed towards a mounting shoe and adjustable brace for a pre-cast or tilt-up wall.

A common construction technique relating to the erection of buildings involves first fabricating horizontal panels and then tilting those panels to a vertical orientation for use as the walls of the building. Concrete wall panels are often fabricated in a horizontal position as they can be handled more easily in this position. Pre-cast concrete walls are also often transported to construction sites in a horizontal position.

An important aspect of this construction technique is the need to provide bracing for the tilt-up panels while other panels and connecting structure is being erected. For this purpose, temporary braces are commonly used that extend obliquely from the panel to the adjacent floor. Even if the tilt-up panel is vertical and its weight is fully supported by the floor, the temporary brace must be sturdy enough to counteract winds, loads, or the like.

Current bracing equipment lack a strong mounting footing. Due to the strength limitations of the footings of conventional support braces, multiple braces must be used in order to support the concrete wall slabs on a construction project.

It is the object of the present invention to provide an improved mounting shoe and adjustable support brace.

SUMMARY OF INVENTION

The present invention is directed towards an adjustable support brace for a pre-cast or tilt-up wall. The adjustable support brace comprises a first mounting shoe mounted to a wall, a second mounting shoe mounted to a floor, a leg member having an upper and a lower end, and a threaded support screw. The first mounting shoe is pivotally connected to a mounting cap which is connected to the upper end of the leg member. The lower end of the leg member has an internally threaded receiving aperture which extends at least partially through the length of the leg member. The internally threaded receiving aperture receives the threaded support screw. The support screw is pivotally connected to the second mounting shoe.

The mounting shoe of the present invention comprise a metal plate having a top side, bottom side, a first and second longitudinal extension and a latitudinal extension. The first and second longitudinal extensions, and the latitudinal extension, each contain a bolt receiving slot. Anti-slide projections exist on the top on the metal plate bordering these receiving slots. A pair of mounting brackets are connected to the top side of the metal plate. The mounting brackets contain a pivot pin aperture. Both the mounting cap and the threaded support screw of the present invention have mounting apertures, whereby the mounting cap and the threaded support crew are connected to the mounting brackets of the mounting shoes by the presence of a pivot pin.

One advantage of the present invention is that the mounting shoe of the adjustable support brace is designed to utilize multiple mounting bolts. The working load of the support brace is therefore significantly increased. With the increased working load, a support system can be created for the concrete walls of a construction project utilizing fewer support braces of the present invention, than would be needed with conventional support braces. The design of the receiving slots of the mounting shoe allows for a number of bolts to be pre-positioned into a floor or wall, and allows the mounting show to be slid on the pre-positioned bolts. The mounting bolts can then be tightened, securing the mounting shoe.

Figure 1:
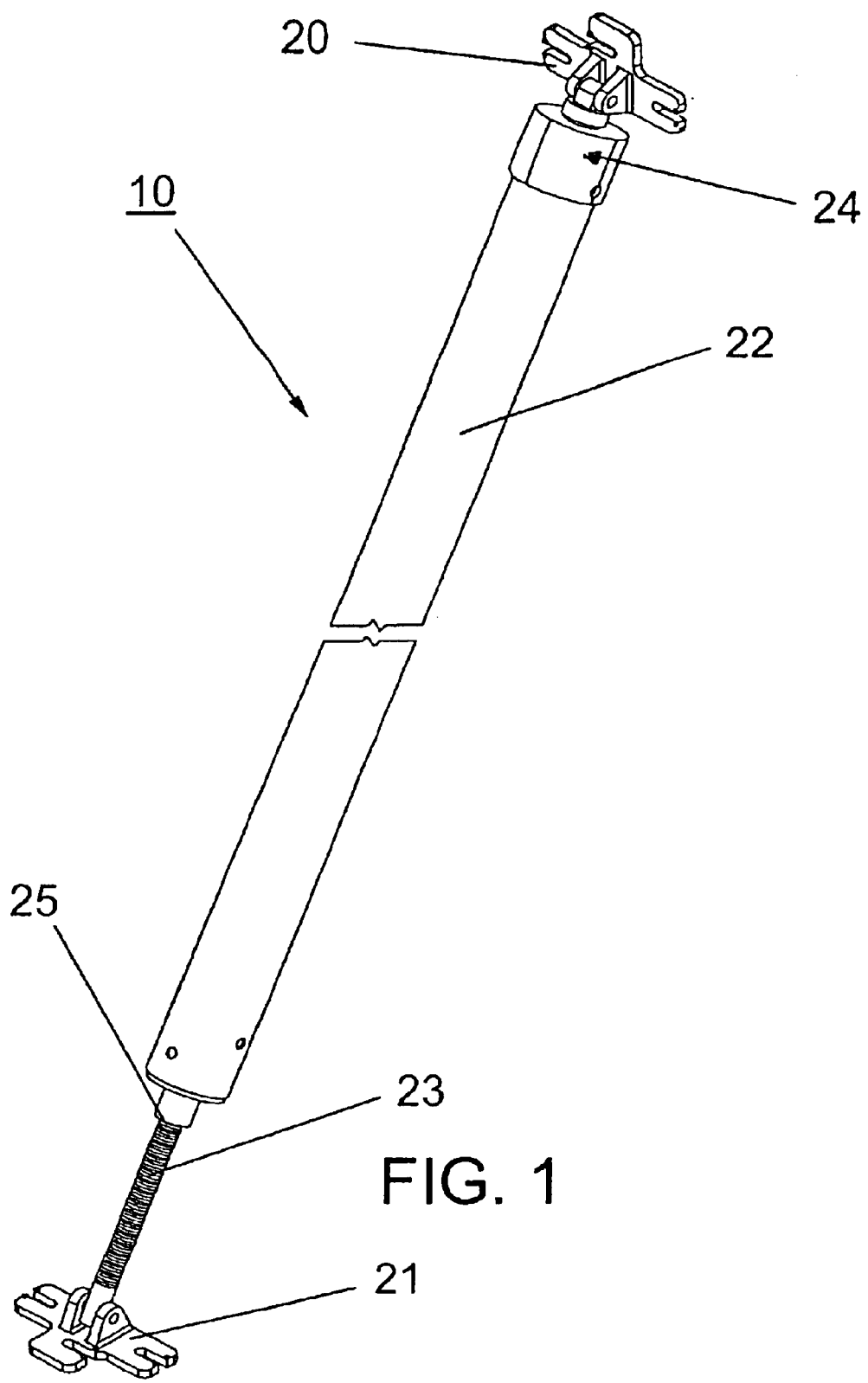
FIG. 1 shows a perspective view of an adjustable support brace of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE INVENTION

The present invention is detailed in FIGS. 1–5. One embodiment of the present invention is directed towards an adjustable support brace 10 for a pre-cast or tilt-up concrete wall 100. This aspect of the invention is detailed in FIGS. 1 and 2. The support brace 10 of the present invention comprises a first mounting shoe 20, a second mounting shoe 21, a leg member 22 having an upper and a lower end, and a threaded support screw 23. The first mounting shoe 20 is pivotally connected to a mounting cap 24 which is connected to the upper end of the leg member 22. The lower end of the leg member has an internally threaded receiving aperture 25 which extends at least partially through the length of the leg member 22. The internally threaded receiving aperture 25 receives the threaded support screw 23. The support screw 23 is pivotally connected to the second mounting shoe 21.

Figure 2:
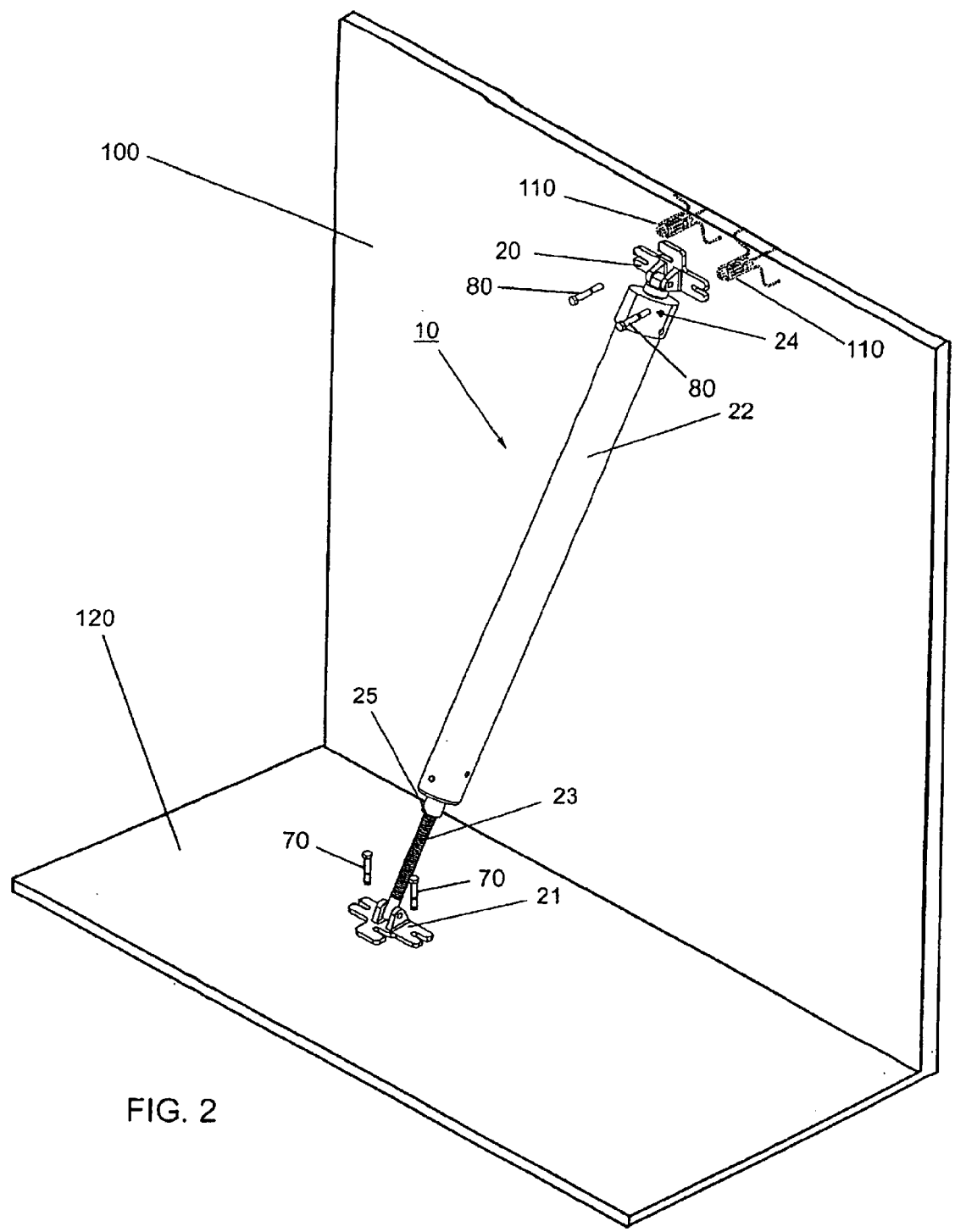
FIG. 2 shows a perspective view of the adjustable support brace in use supporting a concrete wall.
Figure 3:
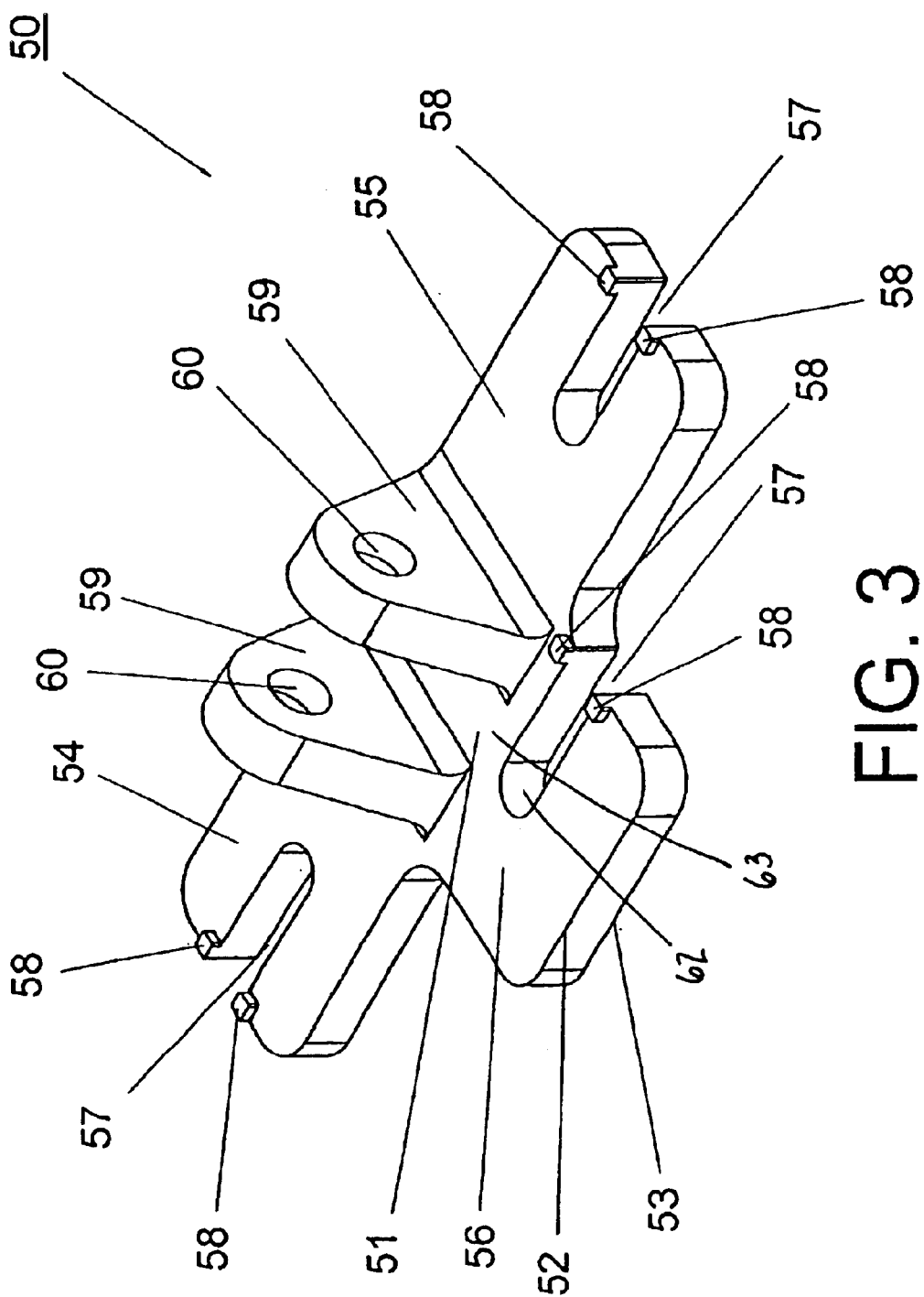
FIG. 3 shows a perspective view of the mounting shoe of the present invention.
Figure 4:
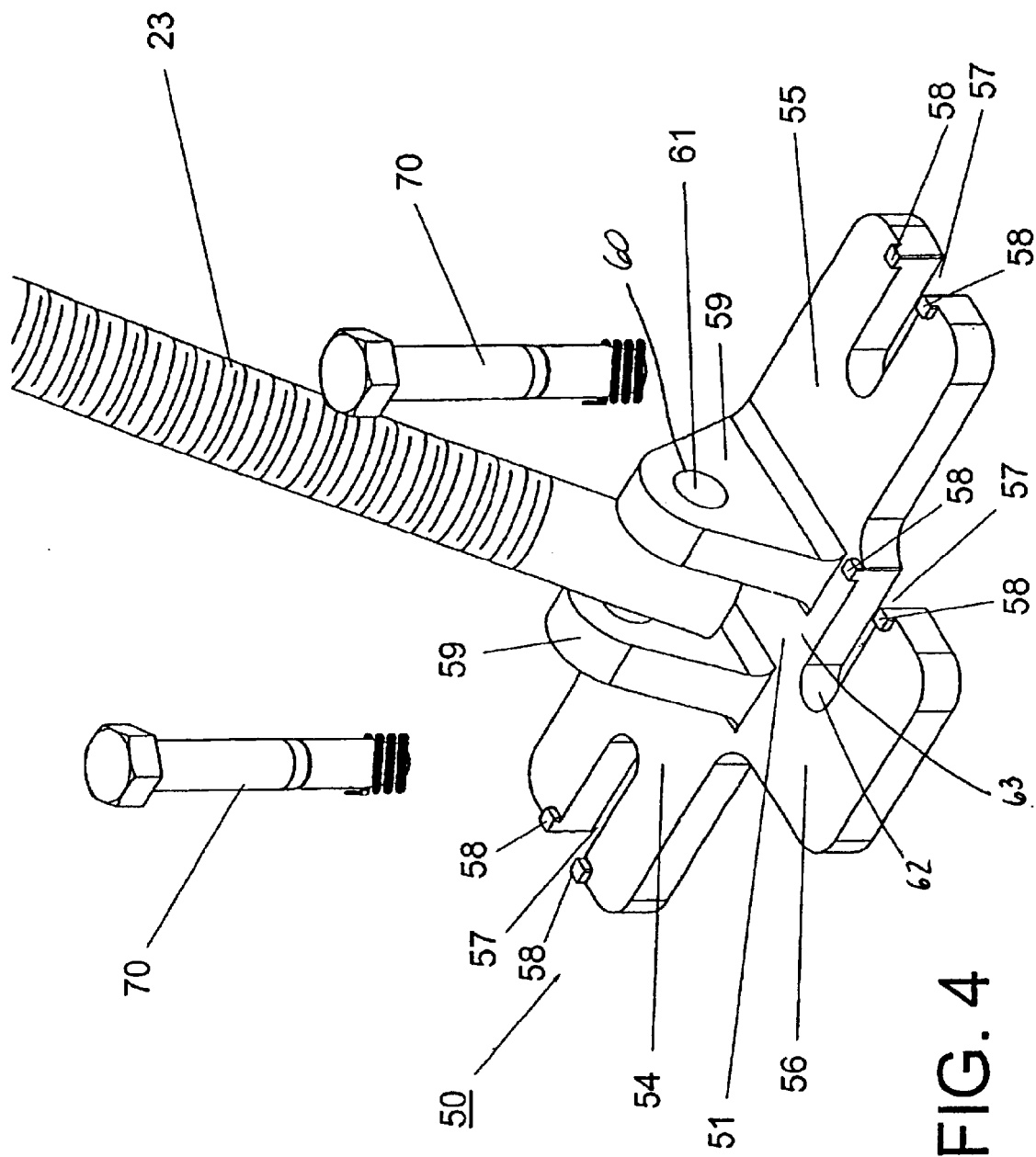
FIG. 4 shows a partial perspective view of the mounting shoe utilized of the adjustable support brace as mounted to a floor.
Figure 5:
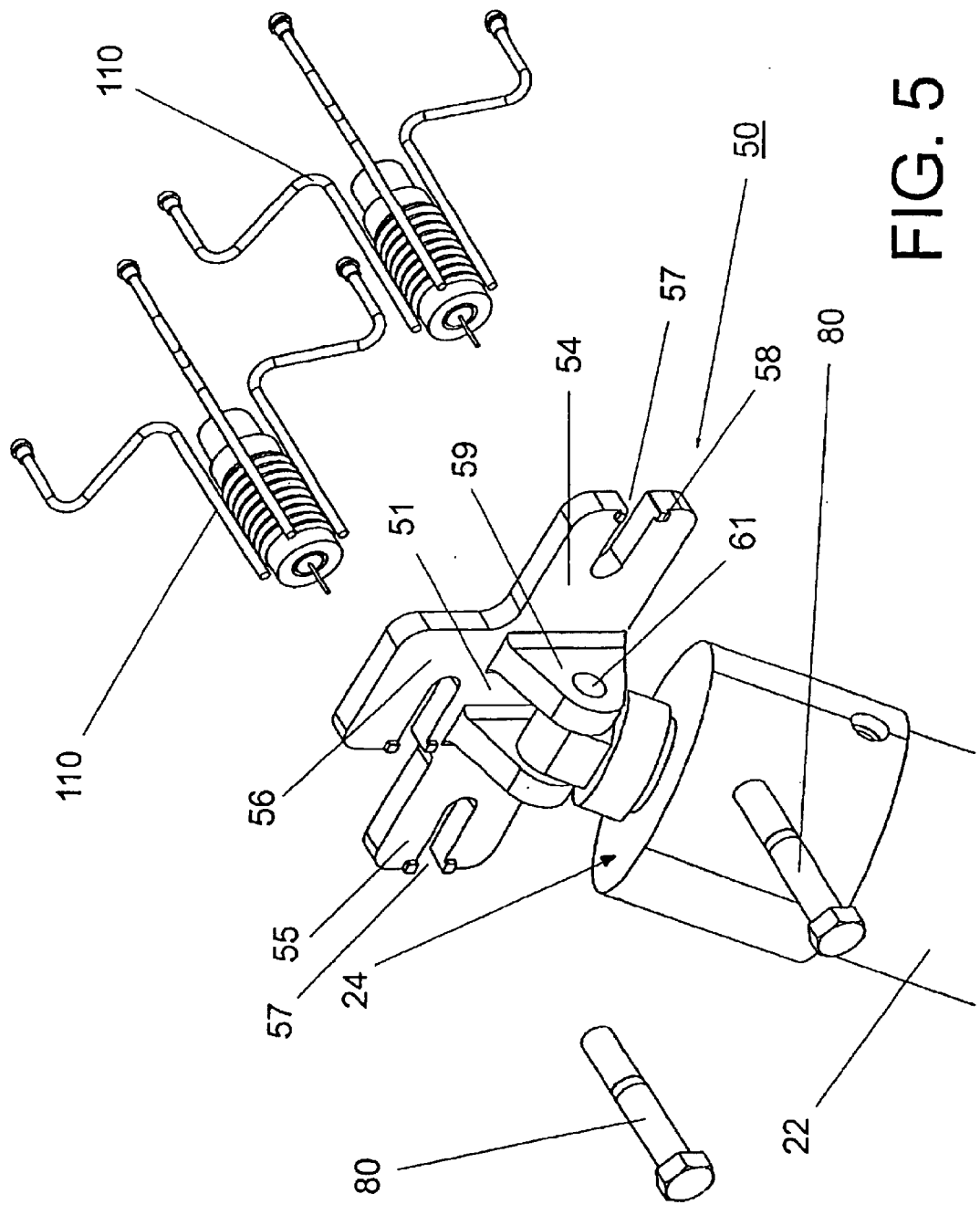
FIG. 5 shows a partial perspective view of the mounting shoe of the adjustable support brace as mounted to a concrete wall.

The use of adjustable support brace is detailed in FIGS. 2, 4 and 5. The first mounting shoe 21 is bonded to a concrete or wooden floor 120 with at least two bolts 70. A pre-cast or tilt up concrete wall 100 is formed containing bolt receiving units 110. The first mounting shoe 20 is secured to the bolt receiving units 110 embedded in the concrete wall 100 with at least two bolts 80.

Another aspect of the present invention is a mounting shoe 50 for use with a support brace. This aspect of the invention is detailed in FIGS. 3–5. The mounting shoe 50 of the present invention comprises a metal plate 51 having a top side 52, bottom side 53, a first 54 and second 55 longitudinal extension and a latitudinal extension 56. The first 54 and second 55 longitudinal extensions, and the latitudinal extension 56, each contain a bolt receiving slot 57. The bolt receiving slots 57 have a bottom section 62. Anti-slide projections 58 exist on the top side of the metal plate 52 bordering these receiving slots 57. A pair of mounting brackets 59 are connected to the top side of the metal plate 52. The mounting brackets 59 contain a pivot pin aperture 60. Between the two mounting brackets 59 is an area 63 separating the mounting brackets 59. The bolt receiving slots 57 of the first and second longitudinal extensions 54 and 55 are aligned latitudinally with the pivot pin aperture 60 of the mounting brackets 59. The bottom section 62 of the latitudinal extension 56 is aligned with the area 63 separating the mounting brackets 59.

FIG. 4 shows a mounting shoe 50 pivotally connected to a threaded support screw 23 via a pivot pin 61 which passes through the pivot pin apertures 60 of the mounting brackets 59, and a pivot pin aperture in the threaded support screw 23.

FIG. 5 shows a mounting shoe 50 pivotally connected to a mounting cap 24 attached to a leg member 22. The mounting shoe 50 is attached to the mounting cap 24 via a pivot pin 61 which passes through the pivot pin apertures 60 of the mounting brackets 59 and a pivot pin aperture in the mounting cap 24.

What is claimed is:

1. An adjustable support brace comprising:
    a first mounting shoe having a top side, a bottom side, a first and a second mounting brackets, each mounting bracket having an aperture, a first longitudinal extension, a second longitudinal extension, wherein the first longitudinal extension of the first mounting shoe contains a bolt receiving slot, and the second longitudinal extension of the first mounting shoe contains a bolt receiving slot; wherein the bolt receiving slots of the first and second longitudinal extensions are aligned latitudinally with the aperture of the first and second mounting brackets,
    a second mounting shoe having a top side, a bottom side, a first and a second mounting brackets, each mounting bracket having an aperture, a first longitudinal extension, a second longitudinal extension, wherein the first longitudinal extension of the second mounting shoe contains a bolt receiving slot, and the second longitudinal extension the second mounting shoe contains a bolt receiving slot; wherein the bolt receiving slots of the first and second longitudinal extensions are aligned latitudinally with the aperture of the first and second mounting brackets,
    a leg member having an upper end and a lower end, wherein the lower end has an internally threaded receiving aperture;
    a threaded support screw;
    a mounting cap;
    wherein the first mounting shoe is pivotally connected to the threaded support screw, the support screw is received by the threaded receiving aperture, the mounting cap is attached to the upper end of the leg member, and the second mounting shoe is pivotally connected to the mounting cap.

2. The adjustable support brace of claim 1, wherein the first mounting shoe further comprises a latitudinal extension having a bolt receiving slot.

3. The adjustable support brace of claim 2, wherein the first mounting shoe further comprises anti-slide projections which border the bolt receiving slot of the first longitudinal extension of the first mounting shoe, the bolt receiving slot of the second longitudinal extension of the first mounting shoe, and the bolt receiving slot of the latitudinal extension of the first mounting shoe.

4. The adjustable support brace of claim 1, wherein the second mounting shoe further comprises a latitudinal extension having a bolt receiving slot.

5. The adjustable support brace of claim 4, wherein the second mounting shoe further comprises anti-slide projections which border the bolt receiving slot of the first longitudinal extension of the second mounting shoe, the bolt receiving slot of the second longitudinal extension of the second mounting shoe, and the bolt receiving slot of the latitudinal extension of the second mounting shoe.

6. The adjustable support brace of claim 1, wherein the first mounting shoe further comprises anti-slide projections which border the bolt receiving slot of the first longitudinal extension of the first mounting shoe, and the bolt receiving slot of the second longitudinal extension of the first mounting shoe.

7. The adjustable support brace of claim 1, wherein the second mounting shoe further comprises anti-slide projections which border the bolt receiving slot of the first longitudinal extension of the second mounting shoe, and the bolt receiving slot of the second longitudinal extension of the second mounting shoe.

8. An adjustable support brace comprising:
    a first mounting shoe having a top side, a bottom side, a first and a second mounting brackets, each mounting bracket having an aperture, a first longitudinal extension, a second longitudinal extension, a latitudinal extension, wherein the first longitudinal extension of the first mounting shoe contains a bolt receiving slot which is bordered by anti-slide projections, the second longitudinal extension of the first mounting shoe contains a bolt receiving slot which is bordered by anti-slide projections, the latitudinal extension of the first mounting shoe contains a bolt receiving slot which is bordered by anti-slide projections; and wherein the bolt receiving slots of the first and second longitudinal extensions are aligned latitudinally with the aperture of the first and second mounting brackets,
    a second mounting shoe having a top side, a bottom side, a first and a second mounting brackets, each mounting bracket having an aperture, a first longitudinal extension, a second longitudinal extension, a latitudinal extension, wherein the first longitudinal extension of the second mounting shoe contains a bolt receiving slot which is bordered by anti-slide projections, the second longitudinal extension of the second mounting shoe contains a bolt receiving slot which is bordered by anti-slide projections, the latitudinal extension of the second mounting shoe contains a bolt receiving slot which is bordered by anti-slide projections; and wherein the bolt receiving slots of the first and second longitudinal extensions are aligned latitudinally with the aperture of the first and second mounting brackets,
    a leg member having an upper end and a lower end, wherein the lower end has an internally threaded receiving aperture;
    a threaded support screw;
    a mounting cap;
    wherein the first mounting shoe is pivotally connected to the threaded support screw, the support screw is received by the threaded receiving aperture, the mounting cap is attached to the upper end of the leg member, and the second mounting shoe is pivotally connected to the mounting cap.

9. An adjustable support brace kit comprising:

a mounting shoe having a top side, a bottom side, a first and a second mounting brackets, each mounting bracket having an aperture, a first longitudinal extension, a second longitudinal extension, wherein the first longitudinal extension contains a bolt receiving slot, and the second longitudinal extension contains a bolt receiving slot; and a leg member having an upper and lower end;

and wherein the bolt receiving slots of the first and second longitudinal extensions are aligned latitudinally with the aperture of the first and second mounting brackets.

10. The adjustable support brace kit of claim 9 further wherein the lower end of the leg member has an internally threaded receiving aperture.

11. The adjustable support brace kit of claim 10 further comprising a threaded support screw.

12. The adjustable support brace kit of claim 9 further comprising a mounting cap.

13. The adjustable support brace kit of claim 9 wherein the mounting shoe further comprises a latitudinal extension having a bolt receiving slot.

14. The adjustable support brace kit of claim 13 wherein the mounting shoe further comprises anti-slide projections which border the bolt receiving slot of the first longitudinal extension, the bolt receiving slot of the second longitudinal extension, and the bolt receiving slot of the latitudinal extension.

15. The adjustable support brace kit of claim 9 wherein the mounting shoe further comprises anti-slide projections which border the bolt receiving slot of the first longitudinal extension, and the bolt receiving slot of the second longitudinal extension.

16. A mounting shoe comprising:

a top side, a bottom side, a first and a second mounting bracket, each mounting bracket having an aperture, a first longitudinal extension, a second longitudinal extension, wherein the first longitudinal extension of contains a bolt receiving slot, and the second longitudinal extension contains a bolt receiving slot;

and wherein the bolt receiving slots of the first and second longitudinal extensions are aligned latitudinally with the aperture of the first and second mounting brackets.

17. The mounting shoe of claim 16 further comprising a latitudinal extension having a bolt receiving slot.

18. The mounting shoe of claim 17 further comprising anti-slide projections which border the bolt receiving slot of the first longitudinal extension, the bolt receiving slot of the second longitudinal extension, and the bolt receiving slot of the latitudinal extension.

19. The mounting shoe of claim 17, wherein the bolt receiving slot of the latitudinal extension has a bottom section which is longitudinally aligned with an area between the first and second mounting brackets.

20. The mounting shoe of claim 16 further comprising anti-slide projections which border the bolt receiving slot of the first longitudinal extension, and the bolt receiving slot of the second longitudinal extension.

* * * * *